Aug. 3, 1943.                G. M. HORNER ET AL            2,326,097
                          HINGED MOLDBOARD PLOW
                          Filed April 30, 1942          2 Sheets-Sheet 1
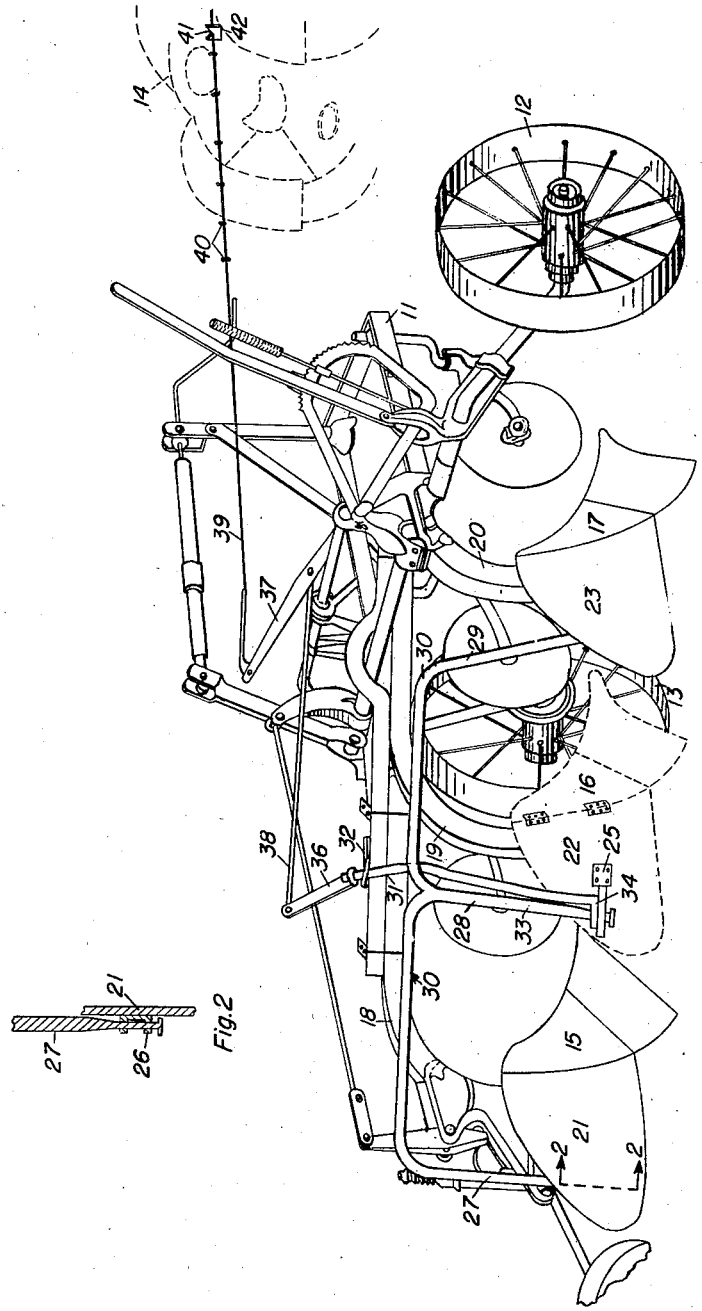
Inventors
Glen M. Horner
Loy M. Naffzinger
By A. J. Kramer
Attorney Aug. 3, 1943.　　G. M. HORNER ET AL　　2,326,097
HINGED MOLDBOARD PLOW
Filed April 30, 1942　　2 Sheets-Sheet 2

INVENTORS
GLEN M. HORNER
LOY M. NAFFZINGER
BY
ATTORNEYS

Patented Aug. 3, 1943

2,326,097

UNITED STATES PATENT OFFICE 2,326,097

HINGED MOLDBOARD PLOW

Glen M. Horner and Loy M. Naffziger, Pullman, Wash., assignors to Claude R. Wickard, as Secretary of Agriculture of the United States of America, and his successors in office Application April 30, 1942, Serial No. 441,066

1 Claim. (Cl. 97—118)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to moldboard plows, and the general object is the provision of means in combination with a moldboard of the hinged type for quickly adjusting its position while the plow is in motion. Adjustments of this kind permit regulation of the turning action of the plow for different operating conditions.

Another object of this invention is the provision of such means in combination with a plurality of moldboard plows attached to a single vehicle.

Other objects and advantages of this invention will be apparent from the following description in connection with the accompanying drawings, illustrating an embodiment of this invention, in which:

Figure 1 is an elevational view of the embodiment attached to a vehicle frame, carrying a plurality of plows, one of which is illustrated in phantom, the view being at an angle to bring the plane of the plows parallel to the picture plane.

Figure 2 is a section along the line 2—2 of Figure 1.

Figure 3:
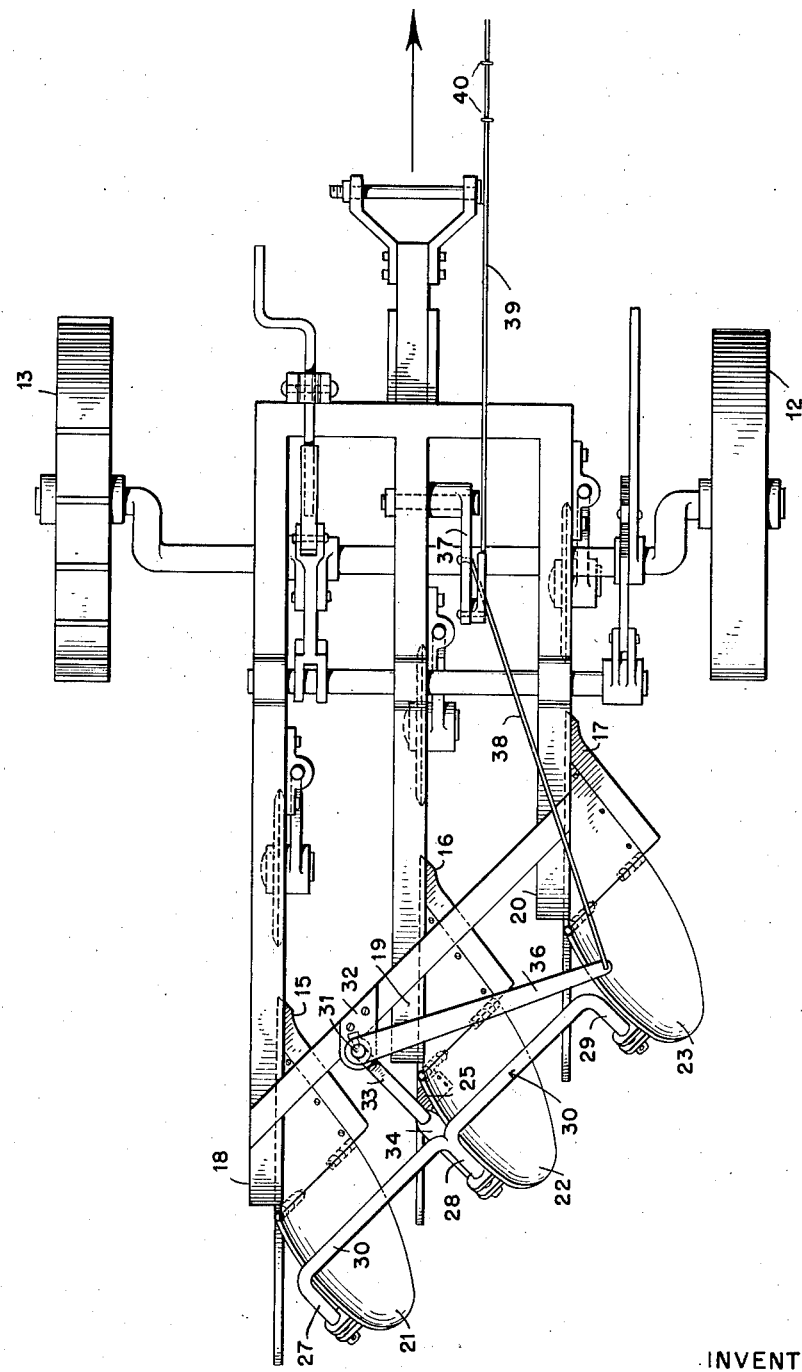
Figure 3 is a plan view.

Referring with more particularity to the drawings in which like numerals designate like parts, the embodiment is mounted on the frame of a suitable vehicle 11, supported on wheels 12 and 13, adapted to be drawn by a tractor 14, shown fragmentarily.

A plurality of plows 15, 16 and 17 are secured to suitable dependent frame members 18, 19 and 20. The plow 16 is illustrated in phantom in Figure 2. Said plows are of the hinged moldboard type having moldboards 21, 22 and 23 vertically hinged to said plows by any suitable means known to the art. To the back of the moldboards 21, 22 and 23 U-shaped brackets are secured like the bracket 25 shown on the moldboard 22. The arms of these brackets pivotally support vertical prongs 27, 28 and 29 of a fork 30. A vertical stub shaft 31 is pivotally held in a bearing 32, which bearing is fixed to or integral with the frame of the vehicle. Integral with the bottom of said shaft 31 is an eccentric arm 33 extending downwardly to the bracket 25 of the moldboard 22. The lower end of the bar 33 is flanged, and the flanged portion 34 pivotally engages the prong 28. To the upper end of the shaft 31, there is fixed one end of an arm 36, which arm extends outward to one side of the vehicle. An operating lever 37, pivoted to the forward end of the vehicle, is connected to the outer end of the arm 36 by means of a link 38 so that when the lever 37 is moved forward, the link 38 pulls the outer end of the arm 36 causing the shaft 31 to rotate and the arm 33 to swing, thereby moving the fork 30 and causing the moldboards 21, 22 and 23 to swing together about their respective hinges. When the plows are in operation, these movements of the moldboards are against the pressure of the soil being plowed.

The lever 37 is operated forward from the seat of the driver on the tractor 14 by means of a cable or rope 39. This cable or rope is provided with knots 40 to set against the notch 41 of a support 42 so as to hold the moldboards in different positions against the pressure of the soil being plowed. Releasing the rope 39 allows the pressure of the soil to swing the moldboards in the opposite direction.

Having thus described our invention, we claim:

In combination with a vehicle and a plurality of plows supported on the vehicle, said plows having moldboards hinged thereto, a rigid fork having arms pivoted to the back of said moldboards for co-movement, an arm for moving said fork so as to swing said moldboards against soil pressure when the plows are in operation, a mechanism including an operating lever for actuating said arm, and means for holding said operating lever in different positions against the action of soil pressures on said moldboards.

GLEN M. HORNER.
LOY M. NAFFZIGER.